TIME BASE GENERATOR

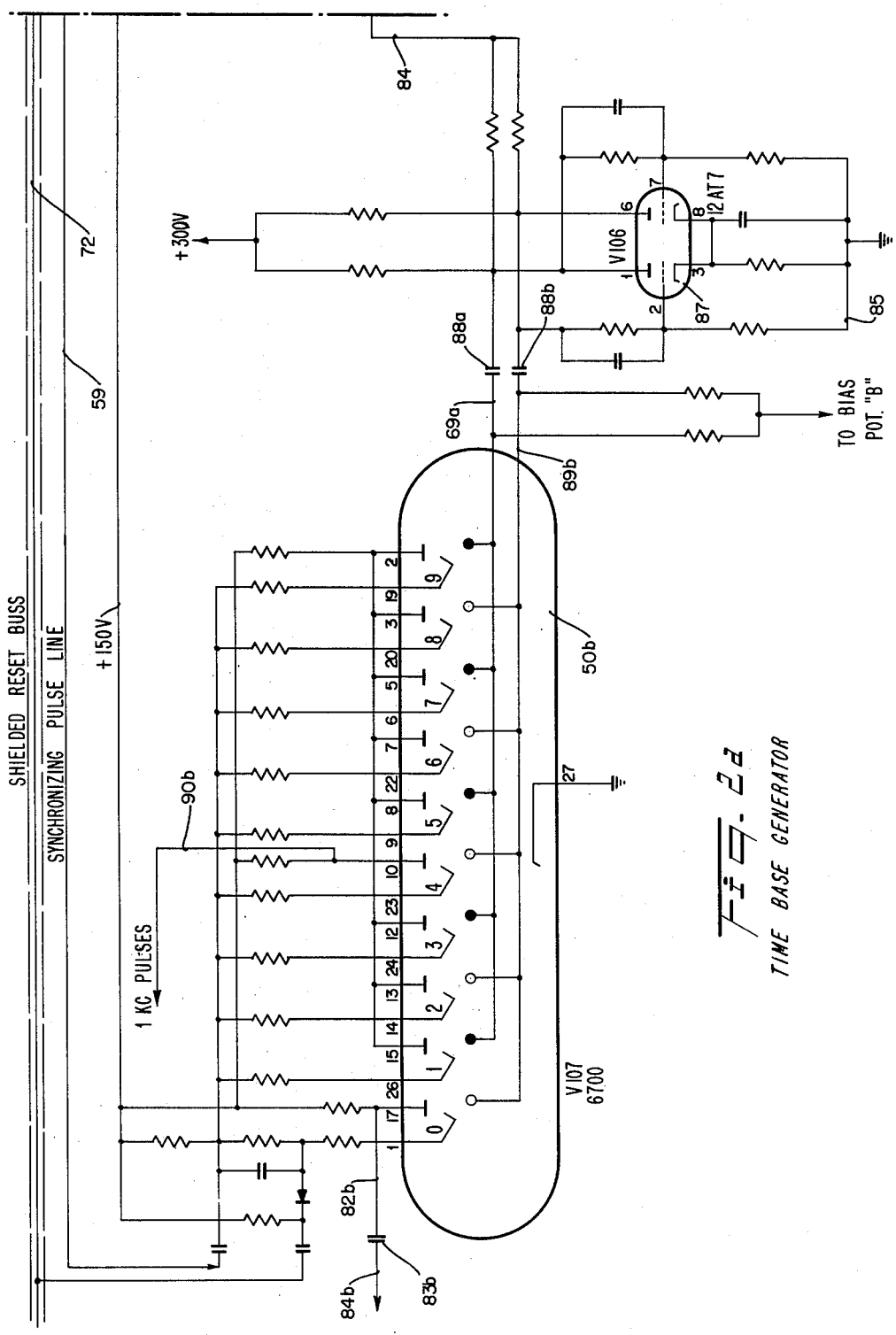

BLOCKING OSCILLATOR

TIME BASE RESET GENERATOR

GATE BINARY

DISPLAY TIME GENERATOR

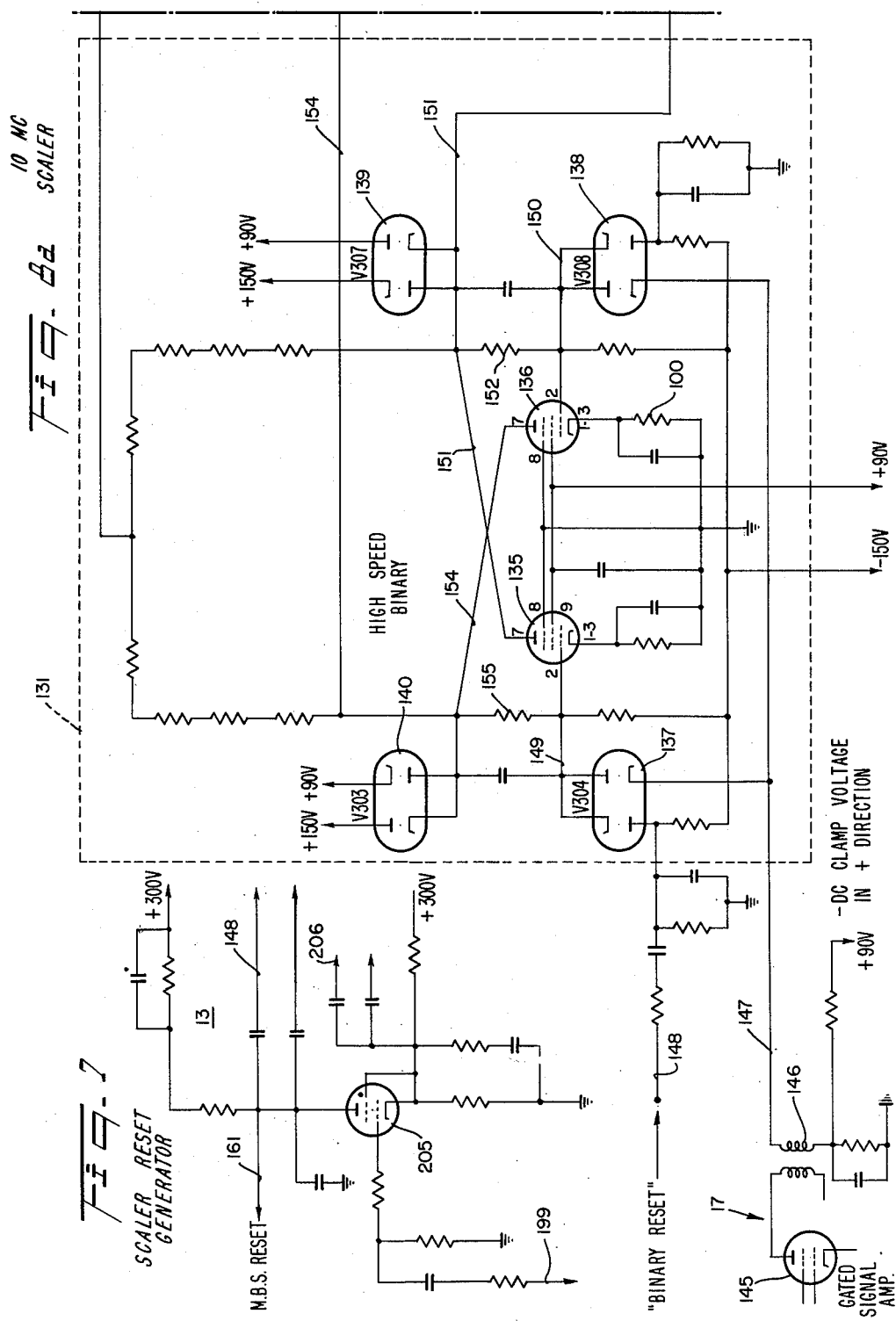

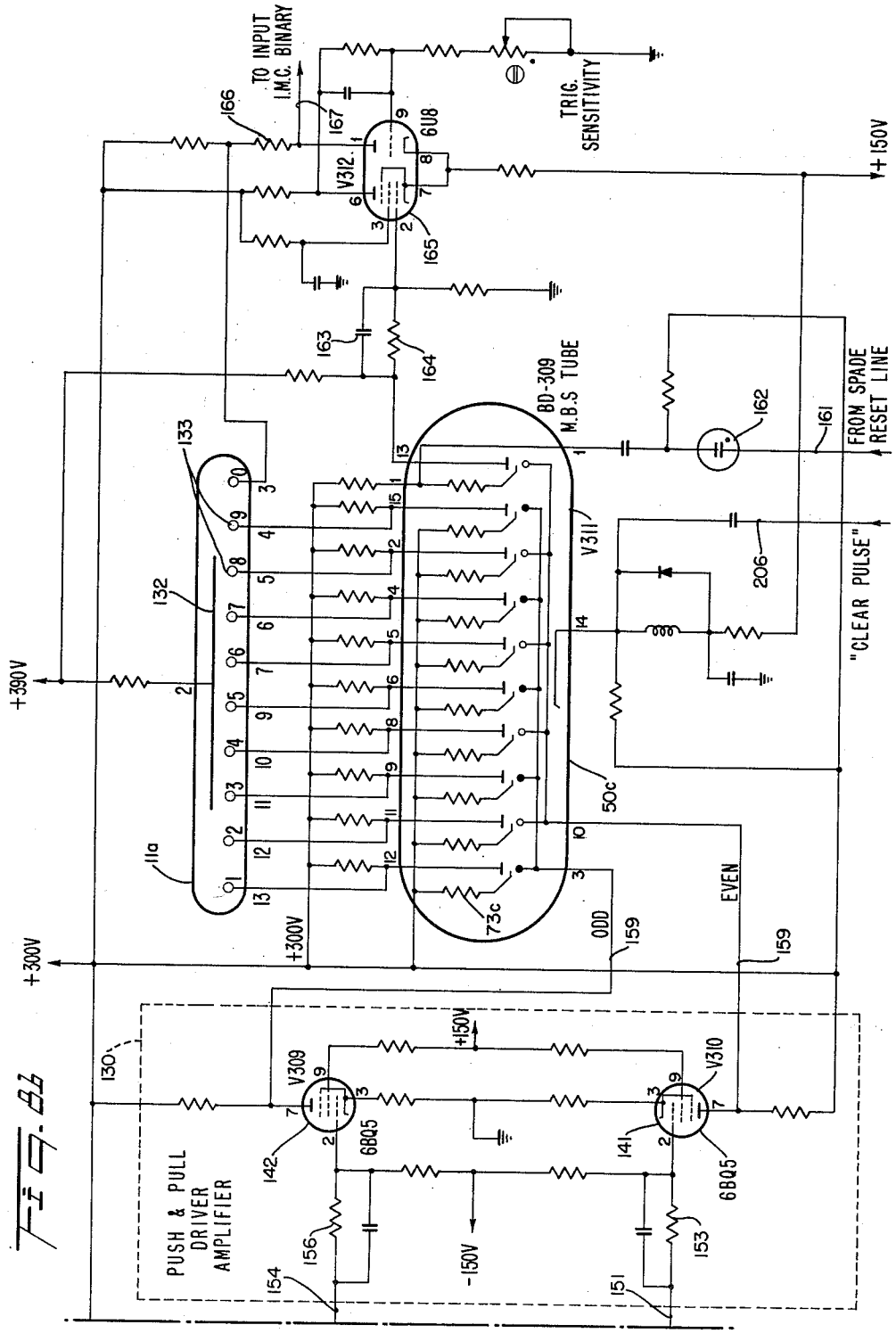

Fig. 9 — 1 MC SCALER

Nov. 24, 1964    H. J. KEEN ETAL    3,158,854
ELECTRONIC COUNTER
Filed Jan. 13, 1960    9 Sheets-Sheet 9
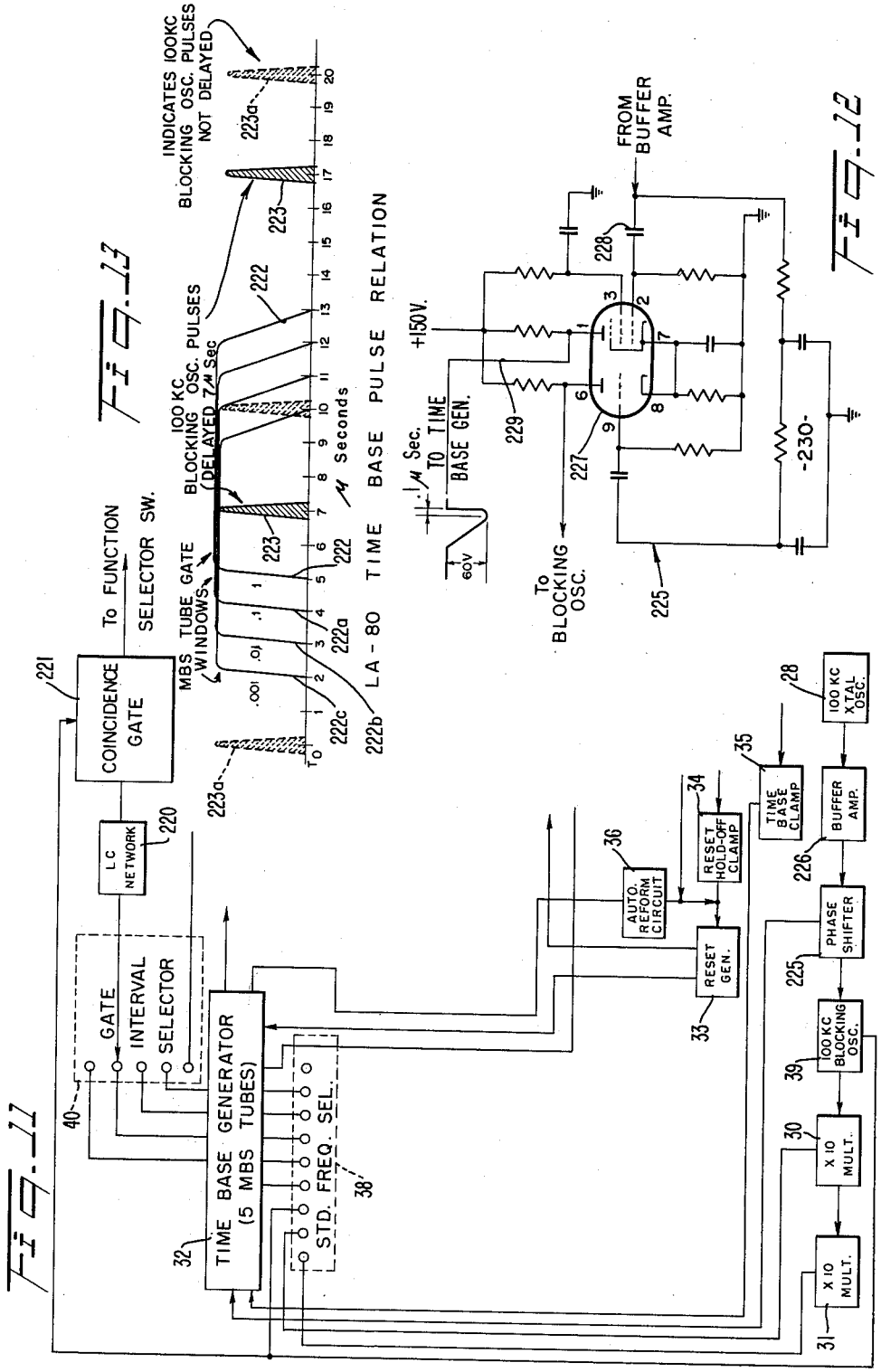

United States Patent Office 3,158,854
Patented Nov. 24, 1964

3,158,854
ELECTRONIC COUNTER
Harry J. Keen, Middletown, Thomas C. Laugesen, Eatontown, and Irving Forman, Lodi, N.J., assignors to Lavoie Laboratories, Inc., Morganville, N.J., a corporation of New Jersey
Filed Jan. 13, 1960, Ser. No. 2,182
10 Claims. (Cl. 340—347)

The present invention relates to measuring instruments and particularly to electronic counters.

It is an object of the invention to provide a highly versatile digital counter that can be used for determining the frequency of an unknown signal, measuring the length of an unknown period or interval and counting the total number of units without reference to time.

A further object of the invention is to provide a high capacity digital counter capable of counting at low speeds or extremely high speeds, for example 10 units to 10 million units a second.

Another object of the invention is to provide an electronic counter which is highly reliable and accurate and is insensitive to temperature changes. An accuracy of 1 in 10 million is obtainable with the apparatus in accordance with the invention.

The invention further provides an electronic counter in which a digital reading is clearly displayed for a selected period of time permitting ease of reading.

The apparatus in accordance with the invention comprises a counter or scaler consisting of a series of magnetic beam switching tubes and associated circuitry, an indicator for displaying the result of a count for a selected period, gate circuits controlling the admission of signal pulses to the scalers, a standard frequency generator including a blocking oscillator, a time base generator providing an accurate reference when counting for a selected interval of time, an amplifier and shaper for input signals sent to the scalers and selector switches including a function selector switch permitting use of the apparatus for different functions. For example, the apparatus can be used to measure the frequency of an unknown signal by feeding the signal to the scalers through the amplifier, shaper and gate circuit while controlling the gate from the time base generator so that the signal is fed to the scaler for a selected period of time, for example one second. There is thus obtained a digital reading of frequency of the unknown signal in cycles per second. Alternatively if it is desired to measure the length of an unknown period or time interval, a selected known frequency from the standard frequency generator is fed through the gate circuit to the scalers while controlling the gate by the unknown signal input. For example if a frequency of one megacycle is fed to the counter, the scaler will give a reading of the unknown time interval in micro seconds. If it is desired to count the total number of units without reference to a time base, the gate is controlled either manually or automatically to start and stop the count. It will thus be seen that the apparatus comprises "building blocks" which can be connected and combined in various ways to perform a variety of functions.

The nature, objects and advantages of the invention will be more fully understood from the following description and claims in conjunction with the accompanying drawings which illustrate by way of example a preferred embodiment of the invention. In the drawings:

FIGS. 2a and 2b are together a schematic diagram of a representative portion of the time base generator of the apparatus.

FIG. 7 is a schematic diagram of a scaler reset generator providing for automatically resetting the scalers at zero after a read-out.

FIGS. 8a and 8b are together a schematic diagram of a magnetic beam switching tube controlling the "units" digit of the indicator together with associated control circuits.

FIG. 9 is a schematic diagram of a second magnetic beam switching tube controlling the "10's" digit of the indicator together with associated circuits.

FIG. 11 is a block diagram corresponding to a portion of FIG. 1 and showing a modification.

FIG. 12 is a schematic diagram of the phase shifter shown in the block diagram of FIG. 11.

FIG. 13 is a diagram illustrating the operation of the apparatus in accordance with FIGS. 11 and 12.

Figure 1:
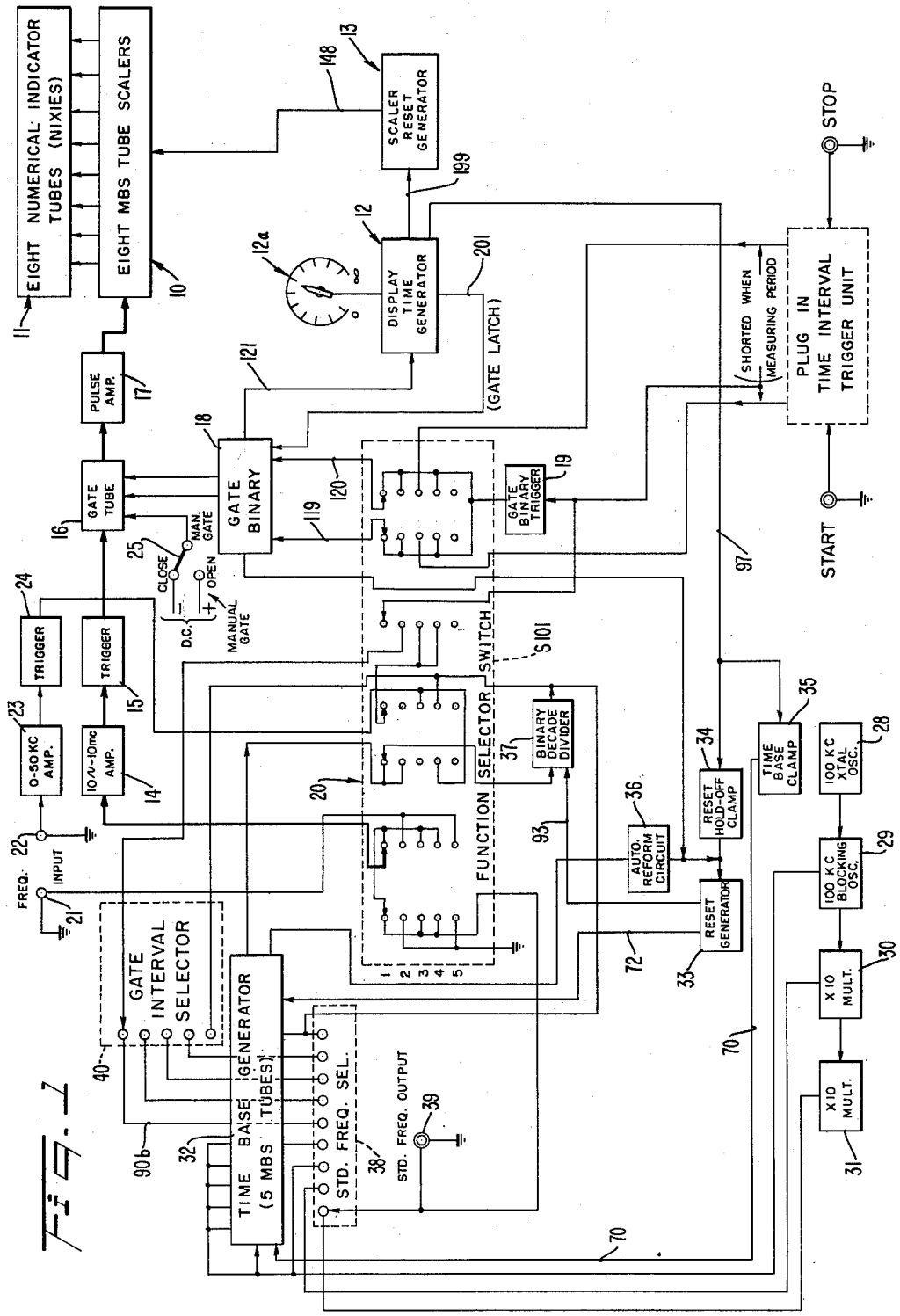
FIG. 1 is a block diagram of an electronic counter embodying the invention.

The apparatus shown by way of example in the drawings comprises a counter or scaler assembly 10 which, as will be described more fully below, comprises a series of magnetic beam switching tubes. Each of the tubes has 10 beam positions and steps sequentially from one position to another as signals are fed into the tube circuit. The tubes are connected in cascade so that as each tube completes a cycle, a signal is fed to the next tube in the sequence. Thus a first tube counts "units," a second counts "10's," a third counts "100's," etc. In the apparatus herein shown and described by way of example there are eight magnetic beam switching tubes in the scaler making it possible to handle eight digit numbers.

An indicator 11 associated with the counter 10 comprises a plurality of indicator units each connected with one of the tubes of the counter and capable of registering from zero to nine. Thus for example when the beam of one of the beam switching tubes of the counter is in the seventh position, the corresponding indicating unit will register the numeral "7." In order to permit rapid operation, the indicating units of the indicator 11 are preferably in-line numerical indicator tubes for example tubes of the kind known in the trade as "Nixie" tubes. In rapid operation the indicator 11 is changing too rapidly to be read by visual observation. In order to provide adequate read-out time, a display time generator 12 is provided for stopping the counter and holding it for a selected period at the position in which it is stopped. A variable control 12a provides for selection of the desired read-out time, for example from one second to 10 seconds. At the end of the selected read-out time a scaler reset generator 13 resets the counter at zero to prepare it for the next count.

A signal comprising waves or pulses that are to be counted is fed into the input of the counter 10. As illustrated in the drawing the input circuit comprises an amplifier 14 for amplifying the signal, a trigger 15 for shaping the signal pulse, a gate 16 operable to admit or cut-off the signal and a pulse amplifier 17. The gate 16 is controlled by a gate binary 18 and a gate binary trigger 19. The binary 18 is interconnected with the display time generator 12 to initiate the read-out display upon the closing of the gate and to latch the gate closed during read-out.

The signal fed into the counter 10 may be either a known or an unknown signal. Likewise, the gate 16 may be controlled by either a known or unknown signal depending on the function the apparatus is set to perform. A function selector switch 20 is provided for changing quickly and easily from one function to another. As illustrated in the drawings the function selector 20 comprises a master switch having seven banks of contacts with five stationary contacts in each bank. A moving contact associated with each of the banks is movable to engage selectively any of the five stationary contacts in the bank. All of the movable contacts are moved in unison by a common manual control. The connections provided will be apparent from the drawings and from the following description.

A signal input jack 21 is provided for connecting to the counter a signal source of unknown frequency that is to be measured. It will be seen that the input jack 21 is connected to the second and fifth contacts in the second bank of the function selector switch 20. A second input jack 22 is provided for connection to the counter of a signal representing an unknown time interval that is to be measured. The input jack 22 is connected through an amplifier 23 and a pulse shaping trigger 24 to the fourth contact in the third bank and the third contact in the fourth bank of the function selector switch. As will be described more fully below, the input signal received through jack 22 is used for controlling the gate 16 when the counter is functioning to measure the length of an unknown period or interval. It will be understood that instead of having two input jacks 21 and 22 as shown, a single jack may be used by providing suitable switching so that the signal can either be fed through the signal input circuit comprising amplifier 9 and trigger 15 or alternatively can be used to control the opening and closing of the gate 16. The gate 16 is also controllable by a manual switch 25 which is used for example for counting a total number of signal input pulses without reference to a time period.

The apparatus in accordance with the invention further includes means for providing signals of known frequency and known time intervals. While the known signals can, if desired, be derived from external sources, the apparatus is shown as including a 100 kc. crystal oscillator 28 connected through a blocking oscillator 29 to frequency multipliers 30 and 31 providing frequencies of 1 mc. to 10 mc. respectively. The blocking oscillator 29 also provides a standard frequency input to a time base generator 32 which, as will be described more fully below, comprises a series of magnetic beam switching tubes connected in cascade so that each provides an output having a frequency which is one tenth of the input. The tubes thus serve as frequency dividers. As herein shown and described by way of example, the time base generator 32 comprises five magnetic beam switching tubes and associated circuits to provide respectively, frequencies of one kilocycle, 100 cycles, ten cycles and one cycle per second. Operation of the time base generator 32 is controlled by a reset generator 33 and a reset hold-off clamp 34 connected with the display time generator 12 so that the operation of the time base generator is synchronized with that of the counter 10. The reset generator is also connected to the gate binary 18 which provides a pulse for resetting the time base generator. The time base generator is further controlled by a time base clamp 35 connected to the display time generator 12. There is also provided an automatic reform circuit 36 for automatically resetting the time base generator in the event its operation is accidentally interrupted for any reason, for example by transient currents.

A binary decade divider 37 is connected to the time base generator in positions 1 and 2 of the function selector switch 20 and provides a longer time interval, for example 10 seconds. In the fourth position of the function selector switch 20, the binary decade divider 37 is connected in circuit with the unknown signal input so as to divide the input signal by 10 and thereby obtain a 10 period average.

A frequency selector switch 38 provides for the selection of a standard frequency which in the first, third and fourth positions of the function selector switch 20 is fed to the input of the counter 10. It will be seen that in the example illustrated in the drawings there is provided a selection of frequencies from 10 mc. to 0.1 cycle per second, the three highest frequencies being obtained from the blocking oscillator 29 and associated multipliers, the lowest frequency being obtained from the binary decade divider 37 and the remaining frequencies being supplied by the time base generator. The frequency selector switch 38 is also connected to an output jack 39 for supplying to an external connection a selected standard frequency. A time interval selector switch 40 provides for the selection of a known period or interval which in positions 1 and 2 of the function selection switch 20 is supplied to the gate binary trigger 19 so as to control the gate 16. The longest time interval (10 seconds) is derived from the binary decade divider 37 while the remaining four standard periods are supplied by the time base generator 32.

The function selector switch 20 is shown as providing five different functions. The first position is for checking the apparatus. A selected standard frequency from the frequency selector 38 is fed to the input of the counter 10 while the gate is controlled from the time base generator to open for a known interval selected by the gate interval selector 40. The proper functioning of the apparatus is thereby determined. The second position provides for measurement of the frequency of an unknown signal. A signal from the input jack 21 is fed into the counter while the gate 16 is controlled from the time base generator so as to be open for a selected known interval, for example one second. A direct reading of cycles per second is thereby obtained. The third position of the function selector switch provides for measurement of an unknown time interval. The gate 16 is controlled by an unknown signal fed in through the input jack 22 and connected to the gate binary trigger 19 while a selected known frequency signal from the standard frequency 38 is fed through the gate 16 to the counter 10. For example if a frequency of one megacycle is selected by the frequency selector 38, a direct reading of the unknown time interval in micro seconds will be obtained. The fourth position of the function selector switch is similar to the third except that it provides a reading for a 10 period average of an unknown signal. In this position of the selector switch the input signal from the jack 22 is fed through the binary decade divider 37 and is thus divided by 10. The fifth position of the function selector switch is for totalizing. An unknown signal from the input jack 21 is fed to the counter 10 while the gate 16 is controlled by the manual switch 25. The apparatus thus provides for carrying out a number of different functions merely by setting the function selector switch 20 and selecting a desired standard frequency by means of the frequency selector switch 38 or a known standard time interval by the interval selector 40.

As certain components of the apparatus in accordance with the invention are conventional, they need not to be described in detail. The following description is hence directed primarily to such portions of the apparatus as are necessary for a full understanding of its construction and operation.

Figure 2B:
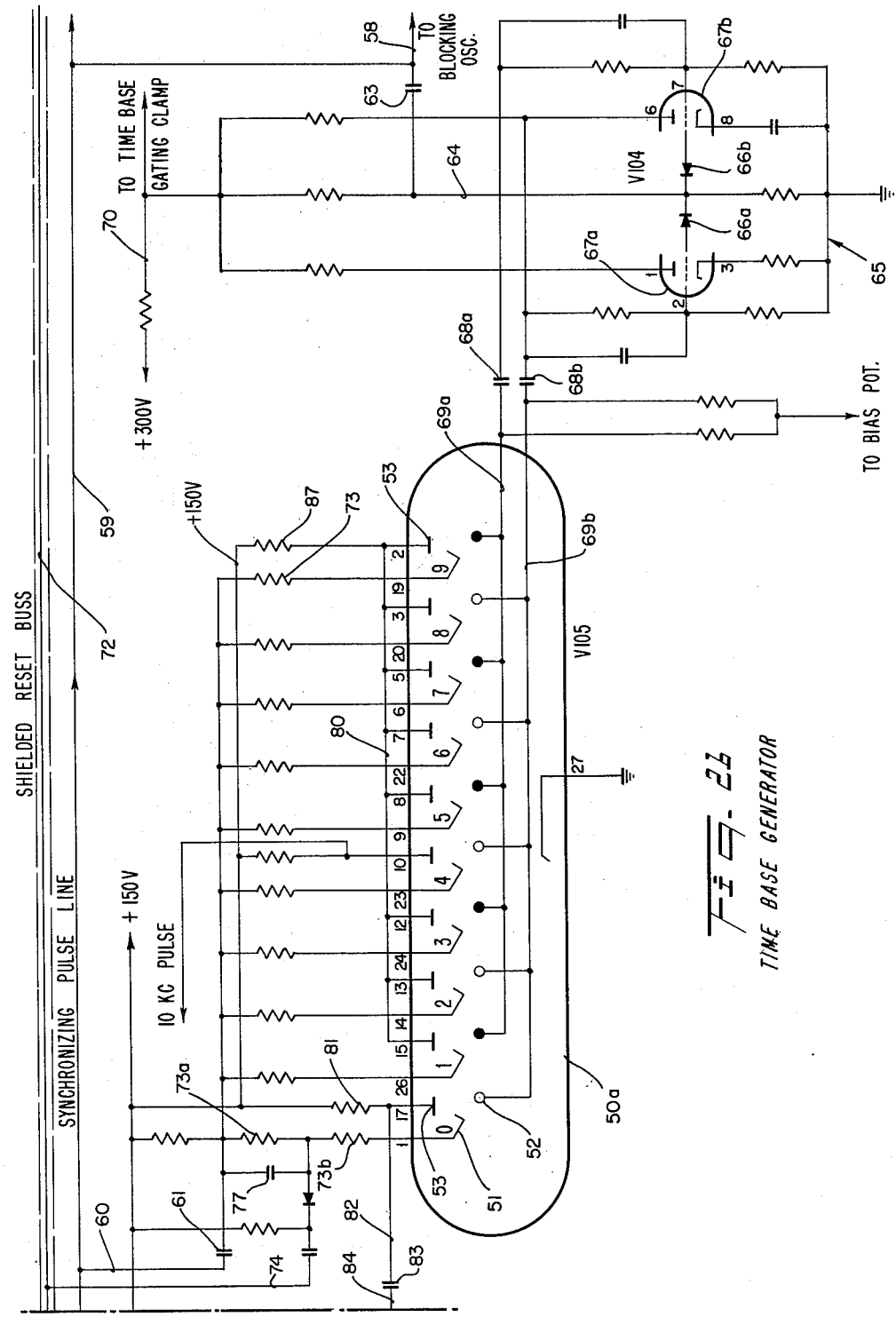
Figure 3:
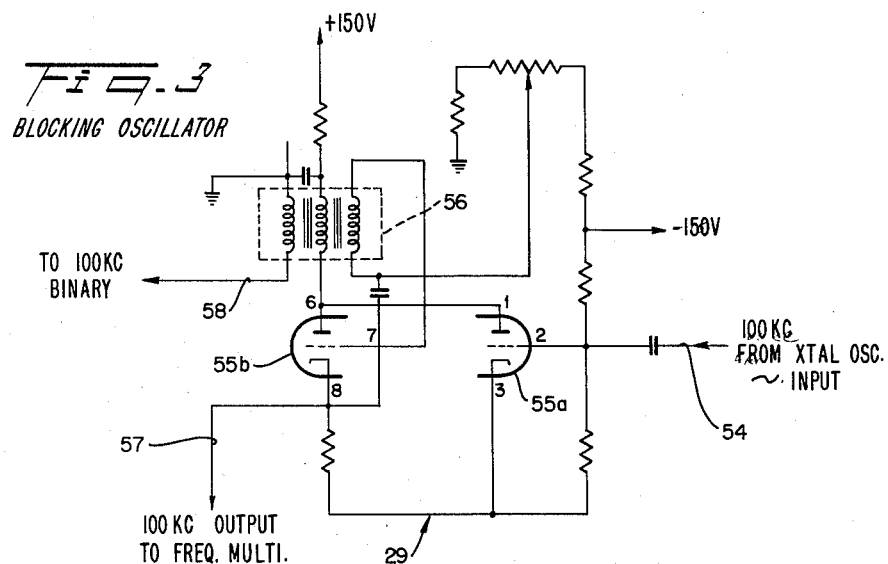
FIG. 3 is a schematic diagram of a blocking oscillator associated with a crystal oscillator providing a standard frequency.
Figure 4:
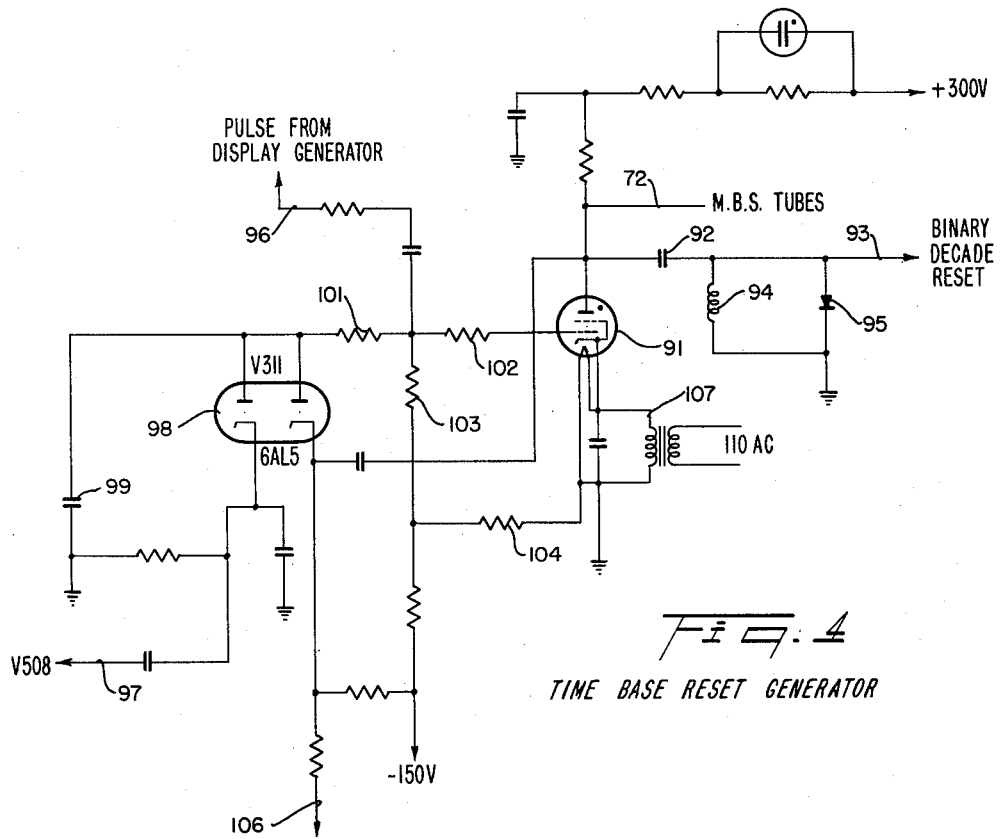
FIG. 4 is a schematic diagram of a time base reset generator associated with and initiating the operation of the time base generator.
Figure 5:
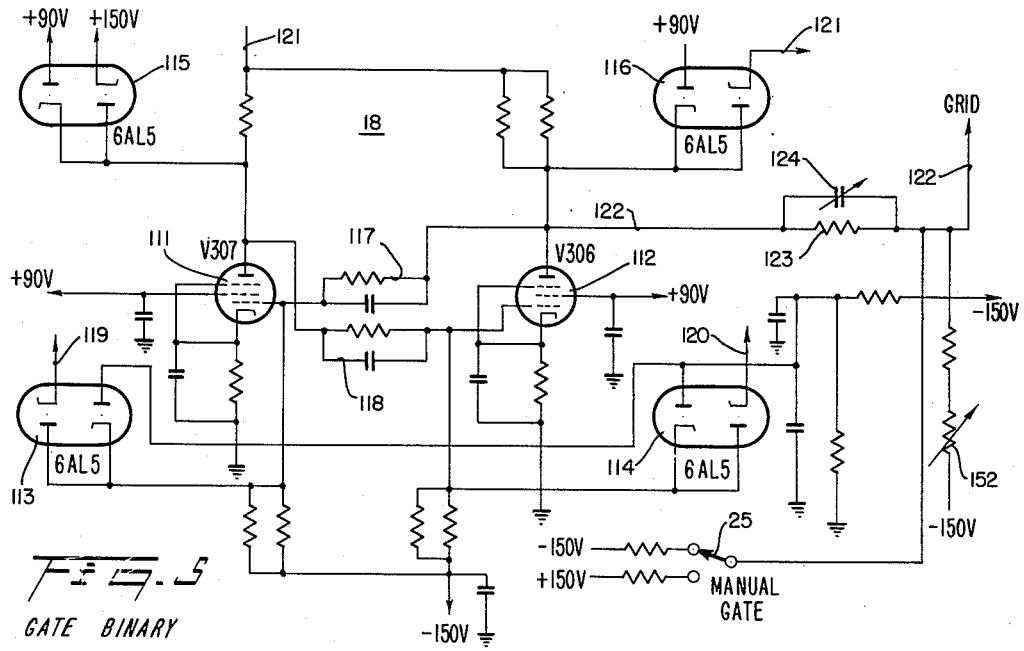
FIG. 5 is a schematic diagram of a gate binary circuit forming a part of the gate circuit for the scalers.

The time base generator 32 (FIG. 1) is shown more fully in FIGS. 2a and 2b while the associated blocking oscillator 29 connected to the input of the time base generator is illustrated in FIG. 3. The time base generator comprises a series of magnetic beam switching tubes 50, individual tubes being differentiated from one another by being designated 50a, 50b, etc. Two of the magnetic beam switching tubes are shown schematically in FIGS. 2a and 2b while the physical arrangement of the tube elements is illustrated on a greatly enlarged scale in FIG. 10. Each a voltage divider comprising a resistance 153 to the control grid of tube 141 of the driver amplifier 130 (FIG. 8b). Similarly the plate of tube 136 is connected through a line 154 to the plate clamp 140 and through a voltage divider comprising a resistance 155 to the control grid of tube 135. The plate of tube 136 is also connected through line 154 and a voltage divider comprising a resistance 156 (FIG. 8b) to the control grid of tube 142. The plate of tube 141 is connected by a lead 158 to the grids at the even positions of magnetic beam switching tube 150c while the plate of tube 142 is similarly connected by a lead 159 to the odd grids of the magnetic beam switching tube. The grids of tubes 135, 136, 141 and 142 are normally biased to cut-off.

Starting with the system in a cleared condition, a positive pulse supplied from the scaler reset generator 13 (FIG. 1) through the input line 148 (FIG. 8a) passes through the grid clamp 137 and is applied to the control grid of tube 135 thereby putting the tube into conduction. When the tube 135 becomes conductive, its plate voltage swings from a selected upper limit to a selected lower limit, the upper and lower limits being maintained respectively by the plate clamp 139. When the lower plate voltage of tube 135 is applied through the lead 151 and resistance 152 to the grid of tube 136, the latter tube is biased to cut-off. As the tube 136 is non-conducting, its voltage rises to a higher value, the voltage swing of tube 136 being similarly controlled by plate clamp 140 which supplies or absorbs voltage to maintain the selected value. The lower plate voltage of tube 135 —which is conducting—is also applied through lead 151 and resistance 153 (FIG. 8b) to the control grid of tube 141 which is biased to cut-off and hence non-conducting. The higher plate voltage of tube 136—which is non-conducting—is applied through lead 154 and resistance 156 (FIG. 8b) to the control grid of tube 142 so that the latter tube is conducting. Since tube 141 is non-conducting, its plate voltage rises to the B+ potential, for example 300 volts. This voltage is applied through the lead 158 to the even grids of the magnetic beam switching tube 50c. Since tube 142 is conducting and is a power tube, the plate voltage drops to a lower value, for example about 50 volts, which is applied through the lead 159 to the odd grids of the magnetic beam switching tube 50c. The voltage of the cathode of tube 50c is at an intermediate value for example 150 volts so that even grids are positive with respect to the cathode and odd grids are negative. Since the spade voltage of tube 50c is higher than the cathode voltage, for example 300 volts, the spades are positive with respect to the cathode. The tube 50c is thus in an unstable oscillating region and would tend to oscillate rapidly except that it is held from oscillating by the voltages applied to the grids. As the "zero" grid is an even grid, its voltage is positive with respect to the cathode so that a beam can be reformed on the zero spade. Reforming of the beam is effected by a negative pulse of for example 180 volts supplied from a spade reset line 161 (FIG. 8b) coming from the scaler reset generator 13 (FIG. 1) and connected to the zero spade through a neon bulb 162 which serves as a delay of about 2 or 3 micro-seconds. This allows time for the voltages applied to the grids to equalize at the values described above. To relieve the load on the zero target and permit rapid switching, this target is lightly coupled through a condenser 163 and resistance 164 to the control grid of the left half of a tube 165 which is normally conducting. When a beam is formed on the zero target this target becomes conducting causing its voltage to drop. The decrease in voltage from the grid in the left side of tube 165 is connected through a decoupling resistance 166 to the zero digit of the numerical indicator tube 11. The decoupling permits a fast rise pulse to be transmitted to the binary of the next magnetic beam switching tube of the series which is connected by a line 167 to the plate of the right hand side of tube 165.

The remaining digits of the numerical indicator tube 132 are connected to the respective targets of the magnetic beam switching tube 50c by leads 168.

The indicator tube 11 is pre-biased to a selected voltage of from example 390 volts on its anode 132. This pre-biasing makes it possible to use smaller target resistors and thereby keep the time constant down to a very low value, for example a value below one micro second.

With a beam thus formed on the zero target of the magnetic beam switching tube 50c, the system is now ready to start to count pulses. Negative pulses from the pulse transformer 146 which forms the output of the pulse amplifier 17 are transmitted through the grid clamps 137 and 138 to the grids of tubes 135 and 136. The first negative pulse cuts off tube 135 which has been conducting. This causes the plate voltage of tube 135 to rise and transmit a positive pulse to the grid of tube 136 which thereby becomes conducting. The voltage rise on the plate of tube 135 is also transmitted through the bead 151 to the grid of tube 141 causing tube 141 to become non-conducting. When the tube 136 becomes conducting, its plate voltage drops and the decreased voltage applied to the grid of tube 142 causes the latter tube to become non-conducting. When the tube 141 becomes conducting, its plate voltage drops for example to a value of 50 volts and this is applied by the direct coupling to the even grids making them below the voltage of the cathode. When the tube 142 becomes non-conducting its plate voltage rises for example to a value of 300 volts which is applied by direct coupling to the odd grids of the magnetic beam switching tube 50c. Reduction of voltage on the zero grid—which is one of the even grids —causes the beam to switch to the next target where it is held by reason of the high positive voltage applied to the grid at the number 1 position—which is one of the odd grids. The beam is thereby switched from the zero position to the number 1 position. The next negative pulse from the pulse amplifier 17 (FIG. 8a) acts in similar manner to cause tubes 136 and 141 to become non-conducting and tubes 135 and 142 to become conducting. The voltage on the odd grids is thereby decreased to a value below cathode voltage and the voltage on the even grids is increased to a value above cathode voltage causing the beam to switch to number 2 position. The switching of the magnetic beam switching tube 50c is continued in like manner as long as the gate 16 (FIG. 1) is open. Each time the beam of tube 50c returns to the zero target, a pulse is transmitted through line 167 (FIGS. 8b and 9) to the binary controlling the input of the next magnetic beam switching tube of the series. The second magnetic beam switching tube is thus operated at one tenth of the speed of the first.

Figure 10:
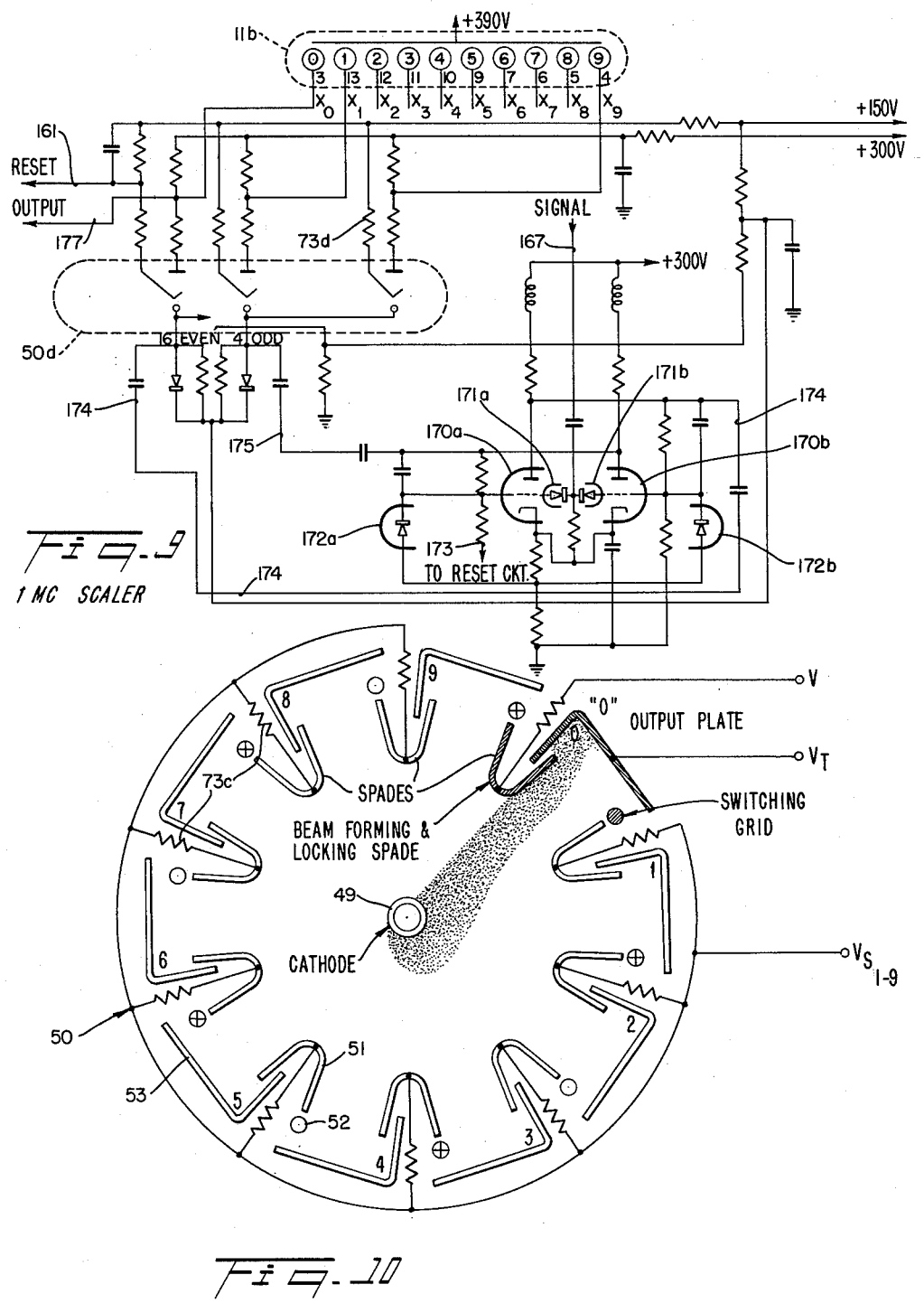
FIG. 10 is an enlarged schematic of a magnetic beam switching tube.

The second stage of the counter 10 (FIG. 1) is shown schematically in FIG. 9 and comprises a magnetic beam switching tube 50d which is like that illustrated in FIG. 10 except that the spade resistances 73d may be outside the tube envelope. The control circuitry may, if desired, be like that of the first stage tube 50c of the counter as illustrated in FIGS. 8a and 8b. However, as the second stage of the counter does not need to operate at such high speed, a simpler control circuit may be used. As illustrated in FIG. 9 the control circuit of the second stage magnetic beam switching tube 50d is a binary circuit comprising a dual diode 170a, 170b, duel diode grid clamps 171a, 171b and a dual diode 172a, 172b together with associated components connected as shown in the drawings. Signal pulses from the zero target of the first stage counter tube are received through line 167 (FIGS. 8b and 9) which is connected to the grids of tubes 170a and 170b through grid clamps 171a and 171b, respectively. The grid of tube 170a is also connected through a lead 173 to the scaler reset generator 13 (FIG. 1) to supply a reset pulse to the binary. The plate of tube 170a is connected by a lead 174 to the zero grid and the other four even grids of the magnetic beam switching tube 50b. The plate of tube 170b is similarly connected by a lead 175 to the odd grids. In order to simplify the drawing, the spades, grids and targets of tube 50d are shown only at the zero 1 and 9 positions. However, it will be understood that the tube has 10 positions as previously described. The zero spade of tube 50d is connected to the same spade reset line 161 as the zero spade of tube 50c (FIG. 8b). Each of the targets of tube 50d is connected to the respective input of a numerical indicator tube 11b which is like the indicator tube 11a shown in FIG. 8b. The zero target is also connected by a line 177 to the input of the next stage of the counter.

A resetting pulse applied to the grid of tube 170a from the scaler reset generator through line 173 causes tube 170a to become non-conductive while tube 170b is conductive. A higher voltage is thereby applied to the even grids of the magnetic beam switching tube 50d while a lower voltage is applied to the odd grids. A few micro seconds later a reset pulse is applied through line 161 to the spade at the zero position of tube 50d to cause a beam to form at the zero position of the tube as described above with reference to the first stage of the counter. After the second stage of the counter is thus reset, successive signals received from the first stage through lead 167 cause the beam to switch successively from the one position to the next in the manner previously described. Each time the beam returns to the zero position, a pulse is transmitted through the output line 177 to trigger the next stage of the counter.

Successive stages of the counter are essentially the same as the second stage. However, because of the lower speeds at which successive stages work, some further simplification of the control circuit is possible. For example in the third stage the diodes 172a and 172b can be omitted and in the fourth and succeeding stages, the grid clamps 171a and 171b may also be omitted. Succeeding stages operate in the same manner as described with reference to the second stage.

A numerical indicator tube like tube 11a shown in FIG. 8b is provided for each of the magnetic beam switching tubes of the counter. These indicators give a direct numerical reading of the quantity counted. However, while the count is continuing, the indicator tubes—particularly those for reading "units" and "tens"—are changing so rapidly that it is impossible to read them. Hence at the conclusion of the count it is necessary to provide a selected display time during which the indicators can be read. For this purpose, there is provided a display time generator, the operation of which is initiated by the closing of the gate 16 at the conclusion of a count.

Figure 6:
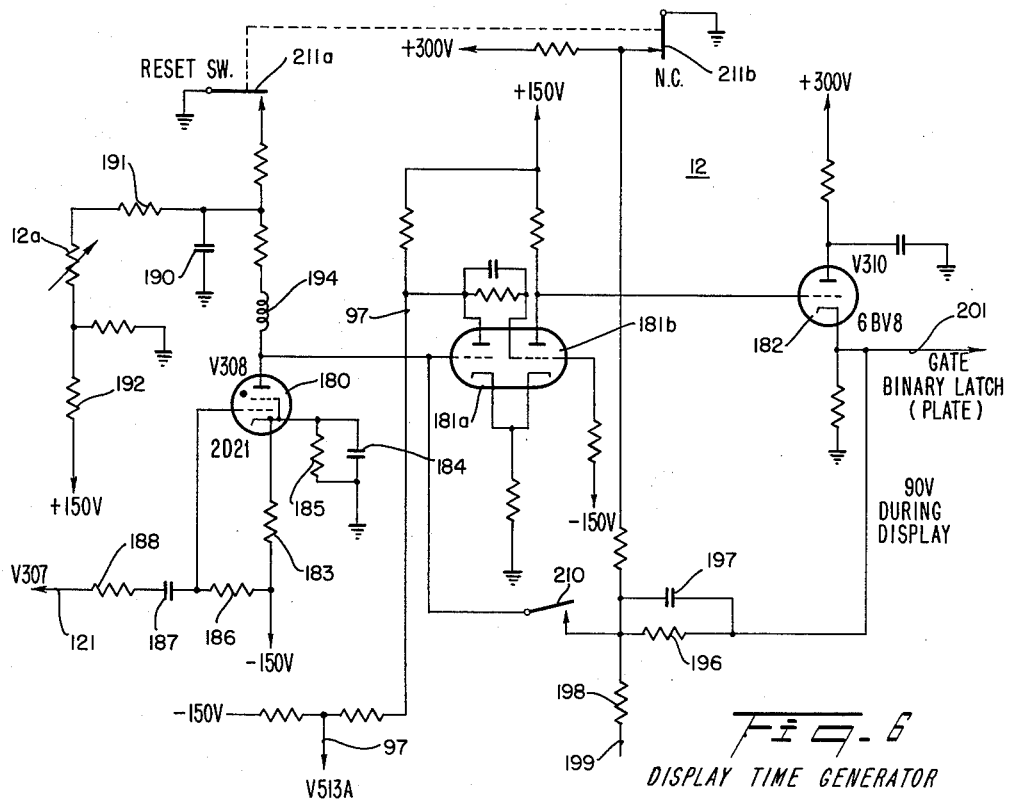
FIG. 6 is a schematic diagram of a display time generator controlling the length of time a reading of the scaler indicator is displayed for read-out.

As illustrated in FIG. 6 the display time generator comprises a thyratron 180, a dual triode 181a and 181b and a triode 182 together with other components connected as shown. The thyratron 180 is operated at an elevated cathode potential derived through a resistance 183 from a B— supply shown as —150 volts. The cathode is also connected to ground through a condenser 184 and resistance 185 in parallel with one another. A negative bias on the thyratron is obtained by connecting the control grid to the B— supply through a resistance 186. The grid of the thyratron is also connected through a condenser 187 and resistance 188 to the line 121 from the gate binary 18 (FIG. 1). When the gate 16 closes at the conclusion of a count, the gate binary 18 supplies a positive pulse through the line 121 to the grid of thyratron 180 causing the thyratron to fire. When the thyratron ignites, the anode circuit discharges a condenser 190, one plate of which is connected to ground while the other is connected through resistances 191 and 192 and a potentiometer 12a to a B+ supply for example +150 volts. The time constant of the anode circuit is variable by means of the potentiometer 12a which thereby controls the length of the display time. The anode circuit of tube 180 also includes a choke coil 194 which assists in extinguishing the tube after it has fired.

The anode of thyratron 180 is connected by a line 184 to the grid of tube 181a which with the other tube half 181b comprises a Schmitt trigger. The tube 181a is normally conducting. When the thyratron 180 fires, the resulting voltage drop in the anode circuit causes tube 181a to become non-conducting with the result that tube 181b becomes conducting. The anode of tube 181b is connected to the grid of tube 182 which acts as a cathode follower. The anode of tube 182 is connected through a resistance 196, condenser 197, resistance 198 and line 199 to the scaler reset generator 13 (FIGS. 1 and 7). It is also connected through a line 201 to the gate binary 118 to prevent the binary from being activated during the display interval. Moreover, the plate of tube 181a is connected by a line 97 to the reset hold-off clamp 34 of the time base generator to inactivate the time base during the display period.

The scaler reset generator 13 is illustrated in FIG. 7 as comprising a thyratron 205 together with other components connected as shown. The grid of the thyratron 205 is connected by a line 199 with the cathode of the cathode follower 182 of the display time generator (FIG. 6). The plate of the thyratron 205 is connected by line 148 to one of the plates of tube 137 of the high speed binary (FIG. 8a) controlling the high speed scaler (FIG. 8b) and by a line 161 to the spade reset input of the high speed scaler (FIG. 8b). The cathode of thyratron 205 is also connected by a line 206 to the cathode circuit of the high speed scaler 50c (FIG. 8b) to provide a pulse for clearing the magnetic beam switching tube.

During the period that the scaler 10 is counting input signals, the thyratron 180 of the display time generator (FIG. 6) is non-conducting, tube 181a is conducting and tube 181b is nonconducting. When the gate 16 closes at the conclusion of a count, a pulse from gate binary 18 is transmitted by line 121 to the grid thyratron 180 causing it to fire. When the thyratron 180 thus becomes conductive, it discharges condenser 190. The resulting voltage drop in the plate circuit of thyratron 180 causes tube 181 to become non-conductive whereupon tube 181b becomes conductive. The resulting drop in plate voltage of tube 181b is transmitted through the cathode follower 182 and line 201 to the gate binary 18 so as to latch the gate out of operation. By reason of the choke coil 194 and other circuit components connected as shown in the drawing (FIG. 6), the thyratron 180 is extinguished as soon as it has discharged the condenser 190. The condenser 190 thereupon gradually becomes recharged at a rate depending on the setting of the potentiometer 12a. When a predetermined voltage value has been reached, tube 181a becomes conductive with the result that tube 181b becomes non-conductive. The resulting rise in the plate voltage of tube 181b produces a positive pulse which is transmitted through the cathode follower 182 and line 199 to the control grid of the thyratron 205 causing the thyratron to fire. The firing of the thyratron 205 produces a pulse for resetting the magnetic beam switching tubes of the scaler, the pulse being transmitted to the high speed binary (FIG. 8a) through line 148 to the cathode circuits of the magnetic beam switching tubes through line 206 and to the spade reset lines of the magnetic beam switching tubes through line 161 the latter pulse being delayed by the neon tube 162 (FIG. 8b) so as to be applied to the zero spades of the magnetic beam switching tubes 2 or 3 micro seconds after the tubes have been cleared.

If it is desired to have a display time greater than that provided by automatic operation of the display time generator, a manual switch 210 (FIG. 6) is closed to provide an infinite display. The display of the indicators is thereby continued until the switch 210 is again opened. There is also provided a manual switch comprising normally opened contacts 211a and normally closed contacts 211b for resetting the scaler at any time desired. Actuation of the switch closes contacts 211a and opens contacts 211b to provide a positive pulse to the thyratron 205 of the scaler reset generator (FIG. 7) causing the generator to operate to reset the scaler.

From the foregoing description of the apparatus, its operation will be readily understood from the following brief description of frequency measurement. In order to measure frequency, the function selector switch is in its second position so as to connect input jack 21 to amplifier 14 in the input circuit of the scaler and to connect the gate binary trigger 19 to the time base generator 32 through the gate interval selector 140 which is set to provide the desired interval, for example 1 second. Starting with the scaler 10 reset and with the time base generator 32 in operation, the first pulse from the time base generator after the resetting of the scaler acts through the gate binary trigger 19 and gate binary 18 to open the gate 16 thereby admitting unknown signal pulses from the jack 21 to the scaler 10. These pulses are counted by the scaler and the count appears on the indicator 11 although the indicator may be changing so rapidly during the count that it cannot be visually read. The next pulse from the time base generator—representing the end of the selected period—acts through the gate binary trigger 19 and gate binary 18 to close the gate 16 thereby stopping the count. When the gate closes, a pulse from the gate binary 18 initiates the operation display time generator 12. During the cycle of operation of the display time generator 12, the magnetic beam switching tubes of the scaler 10 remain in the positions in which they are stopped upon closing of the gate and the indicator tubes of the indicator 11 remain static so as to be easily read. The magnetic beam switching tubes of the time base generator are reset by a pulse from the gate binary 18 when the gate closes but the time base generator is locked out of operation by the clamp 34 under control of the display time generator during the display interval. At the end of the display time as determined by the setting of the potentiometer 12a (FIGS. 1 and 6) the magnetic beam switching tubes of the scaler are automatically reset by the scaler reset generator 13, and the clamp 34 is released to permit operation of the time base generator 32. As the time base generator is reset with the beams of all of the magnetic beam switching tubes in zero position and as the contacts of the gate interval selector 40 are connected to targets of the magnetic beam switching tubes which are spaced from the zero position, for example the fourth or sixth target, there is short interval of time between the end of the display period and the start of a new count. This permits the magnetic beam switching tubes of the time base generator and of the scaler to become fully stabilized so as to provide utmost accuracy.

When performing other functions as selected by the function selector switch 20, the operation of the machine is basically the same except for the fact that the signals actuating the gate and the signals counted by the scaler are selected according to the setting of the function selector switch as described above. When it is desired to count the total number of signals without reference to time, the time base generator is not utilized, the gate 16 being opened and closed manually by means of the manual switch 25 (FIG. 1).

In FIGS. 11 and 12 there is illustrated a modification of the apparatus which provides an alternative and preferred solution to the problem of assuring absolute uniformity of operation. Except for the modifications shown and described the circuit is the same as that of FIG. 1 and like components are designated by the same reference numerals. Instead of being fed directly to the gate binary trigger 19 (FIG. 1) to operate the gate binary 18 and gate tube 16, pulses from the time base generator are fed through an LC network 220 (FIG. 11) to a coincidence gate 221. The rise time portion of the pulse from the selected magnetic beam switching tube of the time base generator is formed by the LC differentiating network 220 into a pulse of selected length, for example, eight micro-seconds. This pulse actuates the coincidence gate 221 to provide a "window" as indicated by the curve 222 in FIG. 13 in which the abscissa represent time in micro-seconds and the ordinants represent voltage. The opening of the coincidence gate 221 by a pulse from the time base generator permits the passage of a sharp pulse from the blocking oscillator 39. It is the pulse from the blocking oscillator that is fed through the function selector switch 20 to the gate binary trigger 19 to actuate the gate binary 18 and gate tube 16. In FIG. 13 the pulses from the blocking oscillator are designated by the curves 223.

The exact position of the window 222 may vary slightly as indicated by curves 222a, 222b and 222c in FIG. 13. To assure that a pulse 223 from the blocking oscillator is wholly within the window 222 despite any variation in its position, the phase of the pulse 223 is shifted from a position indicated by the curve 223a to the position indicated by the curve 223. In the example illustrated in FIG. 13 the phase shift provides a delay of seven mircoseconds. The delay is provided by a phase shifter at 225 to which the output of the crystal oscillator 28 is connected through a buffer amplifier 226. As illustrated in FIG. 12, the phase shifter 225 comprises a dual tube 227. One-half of the tube is an over-driven pentode the control grid of which is connected through a condenser 228 with the output of the buffer amplifier 226. The plate is connected by a lead 229 to the one hundred kc. time base binary 65 of the time base generator 32. (FIG. 2b.) The binary is triggered by a negative pulse. The other half of the tube comprises a triode the grid of which is connected with the buffer amplifier 226 through a phase shift network 230 consisting of the resistances and condensers shown in the drawings. The plate of the second half of the dual tube 227 is connected to the blocking oscillator 39 which is triggered by the positive portion of the sign wave output signal. The phase shift network provides a shifting of phase of the blocking oscillator with respect to the signal provided by the plate of the first half of tube 227 to the time base generator so that pulses from the blocking oscillator are assured of falling within the "window" of the coincidence gate as shown schematically in FIG. 13.

Since, with the circuitry illustrated in FIGS. 11 and 12, the gate tube 16 (FIG. 1) is triggered by a sharp pulse from the blocking oscillator, complete uniformly and accuracy of operation is assured despite any slight variation in pulses from the time base generator as selected by the gate interval or selector 40. Hence, with this arrangement the synchronizing pulse line 59 (FIGS. 2a and 2b) becomes unnecessary and may be omitted.

While preferred embodiments of the invention have been illustrated in the drawings and herein described by way of example, it will be understood that the invention is in no way limited to these embodiments.

What we claim and desired to secure by Letters Patent is:

1. In a high speed electronic counter, the combination of a scaler comprising a series of magnetic beam switching tubes connected in cascade, a scaler input circuit controlling the stepping of said magnetic beam switching tubes, a gate connected to said scaler input circuit, and having a signal input, a gate control circuit for controlling the opening and closing of said gate, a signal input circuit for receiving unknown signal pulses, a time base generator comprising a stable frequency source and a series of magnetic beam switching tubes connected in cascade with the input of the first tube of the series connected to said frequency source and the output of each tube connected to the input of the next tube of the series, each of the tubes of said time base generator thus functioning as a frequency divider, an interval selector switch for selectively connecting the output of a selected tube of said time base generator to an output, and function control switch means for selectively connecting said unknown signal input to said scaler through said gate and for simultaneously connecting said gate control circuit to the output of said interval selector of the time base generator thereby to count the pulses of an unknown signal for an interval of time determined by said time base generator and interval selector, said function switch means having means for connecting said time base generator through said gate to said scaler and means for simultaneously connecting the gate control circuit to said unknown signal input thereby to measure the period of duration of an unknown signal.

2. An electronic counter according to claim 1, further comprising an automatic reform circuit connected to said time base generator and comprising means to supply a pulse to reform the beams of the magnetic beam switching tubes of the time base generator in the event any of said tubes become cleared.

3. An electronic counter according to claim 1, in which each magnetic beam switching tube of the time base generator has two outputs at spaced positions in its cycle of operations and in which one of said outputs of each of said tubes is connected to the input of the next tube of the series while the other of said outputs is connected to said interval selector switch.

4. An electronic counter according to claim 1, further comprising a decade divider selectively connected by said function selector switch to the output of the last magnetic beam switching tube in the series of said time base generator or to the unknown signal input.

5. An electronic counter according to claim 1, in which each of said magnetic beam switching tubes of the scaler has a grid at each of a plurality of positions and in which the control circuit of the scaler comprises a push-pull driver amplifier having two outputs of which one is connected to odd grids of the first tube in the series of the scaler and the other is connected to the even grids of said tube, and a high speed binary having an input connected to a signal source and two outputs connected to said push-pull driver amplifier.

6. An electronic counter according to claim 5, in which said high speed binary comprises two like tube components, each having a plate, cathode and a control grid, a dual diode grid clamp connected to the grid of each of said tube components and a dual diode plate clamp connected to the plate of each of said tube components.

7. In a high speed electronic counter, the combination of a scaler comprising a series of magnetic beam-switching tubes connected in cascade, a scaler input circuit for controlling the stepping of said magnetic beam-switching tubes, a gate connected to said scaler input circuit, and having a signal input, a gate control circuit for controlling the opening and closing of said gate, a signal input circuit for receiving unknown signal pulses, a time base generator comprising a stable frequency source and a series of magnetic beam-switching tubes connected in cascade with the input of the first tube of the series connected to said frequency source and the output of each tube connected to the input of the next tube of the series, each of the tubes of said time base generator thus functioning as a frequency divider, an interval selector switch for selectively connecting the output of a selected tube of said time base generator to an output, and function control switch means for selectively connecting said unknown signal input to said scaler through said gate and for simultaneously connecting said gate control circuit to the output of said interval selector of the time base generator thereby to count the pulses of an unknown signal for an interval of time determined by said time base generator and interval selector, and said function switch means having means for connecting said time base generator through said gate to said scaler and means for simultaneously connecting the gate control circuit to said unknown signal input thereby to measure the period of duration of an unknown signal, said magnetic beam-switching tubes of said scaler each having beam-switching positions corresponding to pulse counting positions, each of said tubes in operation counting a respective order of the digits of a number corresponding to a pulse count, a first one of said tubes corresponding to the order in said number corresponding to the least significant digit of said number thereby corresponding to units in said number, means to cause said beam-switching tubes to switch their beams step-by-step including means to cause said first tube to switch its beam step-by-step to said positions in response to said pulses in the order of ten million units per second in dependence upon the repetition rate of said pulses, whereby said scaler can count pulses having a repetition rate in the order of ten megacycles.

8. An electronic arrangement for counting pulses from a source thereof, said arrangement comprising a multi-target beam switching tube, said tube having a centrally located cathode, a plurality of spade elements disposed apart from and about said cathode, a plurality of target elements, each target element being associated with and disposed for cooperative operation with one of said spade elements, a plurality of control grids, said grids being disposed about said cathode and in association with said spade and target elements, means to energize said tube to cause it to assume an indexing beam condition, means connecting the control grids of said tube to said pulse source, said pulses acting to cause said beam to move step-by-step around said cathode to pass current momentarily to said target elements, said means to energize said tube to assume said indexing beam condition comprising means to apply a cathode voltage to said cathode and means to apply to said grids a voltage alternately substantially above and below said cathode voltage to provide a wide swing of grid voltage in operation, and means to apply to said targets a voltage for biasing said tube to an unstable condition for effecting jointly with said swing of grid voltage an operating condition in which said tube is in an unstable oscillating region, whereby the response characteristics of said tube are in condition for effecting high speed beam switching operation of the order of ten megacycles per second when said pulses are applied.

9. A circuit comprising, a stable frequency source supplying a signal of selected frequency, frequency dividing means connected to said source and having means for deriving a plurality of frequencies from said selected frequency, a coincidence gate having an input circuit, a control circuit and an output circuit, means for selectively connecting the input circuit of said gate to said frequency dividing means to apply to said gate a signal of selected frequency for opening said gate, means for shaping said last-mentioned signal to provide an elongated wave of selected duration, control means connected to the control circuit of said gate comprising means for supplying through said coincidence gate a sharp triggering pulse, means connecting said control means to said frequency source, and said connecting means including phase shifting means to position said triggering pulse intermediate the beginning and end of said elongated wave thereby to insure triggering pulses from said control means are applied during an interval said gate is open.

10. A circuit according to claim 9, in which said gate control means comprises a basic oscillator.

References Cited in the file of this patent

UNITED STATES PATENTS

| | | |
|---|---|---|
| 2,768,348 | Grumet et al. | Oct. 23, 1956 |
| 2,769,595 | Bagley | Nov. 6, 1956 |
| 2,850,568 | Welsh | Sept. 2, 1958 |
| 2,871,399 | Scuitto | Jan. 27, 1959 |
| 2,922,576 | Winfield | Jan. 26, 1960 |